United States Patent
Davis, Jr.

(10) Patent No.: US 8,522,728 B2
(45) Date of Patent: Sep. 3, 2013

(54) SAFETY COLLAR WITH CLAMPING CLOSURE MECHANISM

(76) Inventor: Albert H. Davis, Jr., Decatur, GA (US)

( * ) Notice: Subject to any disclaimer, the term of this patent is extended or adjusted under 35 U.S.C. 154(b) by 357 days.

(21) Appl. No.: 12/932,416

(22) Filed: Feb. 24, 2011

(65) Prior Publication Data

US 2012/0216757 A1     Aug. 30, 2012

(51) Int. Cl.
| | | |
|---|---|---|
| A62B 35/00 | (2006.01) | |
| A44B 1/04 | (2006.01) | |
| A44B 11/12 | (2006.01) | |
| A44B 11/25 | (2006.01) | |
| A44B 17/00 | (2006.01) | |
| B68B 5/00 | (2006.01) | |

(52) U.S. Cl.
USPC ............................................. 119/863; 24/170

(58) Field of Classification Search
USPC ................. 119/863; 24/168, 170, 33 R, 33 L, 24/68 E, 171, 311, 31 F, 307, 308, 309, 312, 24/326, 327
See application file for complete search history.

(56) References Cited

U.S. PATENT DOCUMENTS

| | | | | |
|---|---|---|---|---|
| 3,344,486 A | * | 10/1967 | Eveland | 24/194 |
| 3,425,104 A | * | 2/1969 | Mochizuki | 24/265 WS |
| 4,796,336 A | * | 1/1989 | Scully | 24/68 CD |
| 5,431,365 A | * | 7/1995 | Hopkins | 248/683 |
| 6,631,537 B1 | * | 10/2003 | Huang | 24/193 |
| 2001/0022013 A1 | * | 9/2001 | Hsieh | 24/170 |
| 2008/0010786 A1 | * | 1/2008 | Huang | 24/170 |

* cited by examiner

*Primary Examiner* — Monica Williams
(74) *Attorney, Agent, or Firm* — Harry I. Leon; Vivian L. Steadman

(57) ABSTRACT

A collar useful in animal care, which includes a closure connector and a flexible belt having a free end and distal therefrom a thickened knob. Anchored within the connector's frame, the knob is disposed contiguous with a narrow slot formed therein through which all of the belt, except the knob, is initially threaded. Once looped back around the connector's frame, the free end is pushed through the frame until it re-emerges there-from. With the collar adjusted to provide a snug fit, one can then activate a closure mechanism, in which the foot of an arm pivotally connected to the frame clamps a short portion of the belt, across its entire transverse width, against the frame. When the belt is so clamped, pulling on it increases forces pressing the foot against the belt. Cast from a silicon rubber/phosphorescent additive mixture, the belt exhibits luminescent properties, making it visible in the dark.

12 Claims, 4 Drawing Sheets

SAFETY COLLAR WITH CLAMPING CLOSURE MECHANISM

FIELD OF THE INVENTION

The invention relates generally to safety collars fittable to the necks of dogs as well as to a wide variety of inanimate, cylindrically-shaped objects.

BACKGROUND OF THE INVENTION

Snug-fitting collars which dogs can wear day and night in all weather conditions without the collar causing abrasion to the animal's skin are unknown in the prior art. Even leather collars—the belts of which have about the same surface characteristics as does a dog's skin—can cause abrasion, especially when the collar is wet or cold.

Moreover, because the fasteners used to secure these prior art collars feature a locking mechanism in which a single pin engages one of a series of spaced apart holes formed in the collar's belt, the fasteners limit the degree to which the collars can be adjustably fitted to individual dogs. Not only is the degree of adjustability of such a collar limited by its fastener, but also the latter's strength is at best marginal, depending as it does upon a structure in which a single pin engages a stretchable hole. Compounding these problems is the tendency, as the collar ages, for the belt to become brittle and the holes to enlarge, potentially allowing the animal to slip out of its collar and escape.

A need also exists for a safety collar which can be seen in the dark. Such a collar could be used in a wide variety of applications, including helping a pet owner to avoid accidentally stepping on his animal in a darkened hallway or room, as well as to facilitate a person's locating collar-bandable objects, such as scuba diving tanks, when they are obscured from view because of poor lighting conditions.

SUMMARY OF THE INVENTION

The primary object of the present invention is to provide an improved collar for animals, as well as for inanimate, cylindrically-shaped objects, the collar being readily fittable thereon with a high degree of adjustability and having a closure mechanism which, when it is activated, holds the collar's belt in such a way that pulling on the belt increases the forces locking it in place.

A further object of this invention is to provide such a collar with a belt which is stable in both wet and cold environments and which has a finished surface which is a non-irritant to the hair and skin of animals.

A still further object of this invention is to provide an improved collar which exhibits luminescent properties, allowing the animal wearing it or, alternately, an inanimate object about which the collar has been banded, to be seen in the dark.

The improved collar comprises a belt and a connector, the connector having a frame with at least one narrow, elongated slot through which the belt's free end can be threaded, a movable arm pivotally connected to the frame, and means, including a foot on the movable arm, for pressing a short portion of the belt, once its free end has been so threaded, against the frame in such a way that, during use, the entire transverse width of said short portion is pressed between the foot and the frame. Distal from the belt's free end, the belt terminates in a thickened knob which protrudes perpendicularly from both the belt's inner and outer sides. Prior to use, the thickened knob is positioned within the connector so that the knob abuts the frame along both of the slot's elongated edges, these edges being preferably spaced apart by a distance which is just wide enough to allow every part of the belt except for the knob to be passed between them.

In addition, the thickened knob preferably defines a hole, which extends perpendicularly to the belt's longitudinal centerline and which is alignable with a pair of holes formed in the frame, for receiving a metal "D"-shaped ring. Not only can one attach the clip of a leash or the like to this "D"-shaped ring, but also it increases the thickness of the knob, holding the belt even more securely in the elongated slot than it would otherwise be held.

In the preferred embodiment, the belt for the improved collar is fabricated from a rubbery material such as silicon rubber which can be molded in a die to form a smooth finish which does not irritate the hair and skin of animals. Also, during the molding process, a phosphorescent material can be added to the silicon rubber, giving the belt luminescent properties.

In order to fit the improved collar onto an animal's neck or the like, the user first forms a loop in the belt. With the thickened knob secured, within the frame, contiguous with the elongated edges of the slot and with most of the belt disposed, outside of the frame, on the opposite side of the slot from the knob, the belt's free end is then looped back into the frame and pushed through it until the free end re-emerges from the frame. Afterwards, the free end, virtually hidden from view, is positioned between the belt's outer layer, which is part of the loop, and the animal's neck.

Clamping the belt so as to maintain a snug fit follows and is accomplished by rotating the movable arm through an angle of up to approximately 180 degrees. As a result of the arm's rotation, the foot, which may face away from the belt initially, is brought into direct contact with a short portion of the belt and in the process presses this short portion against the frame.

The arm and its foot move in such a way that once the foot engages the belt, pulling on the belt increases those forces pressing it against the frame. In addition, the surfaces of the foot and of the frame which contact said short portion of the belt are preferably knurled in order to give the connector even greater strength.

As a further safety measure, the arm holds its position so tightly, once it has been rotated and the foot pressed against the belt, that it is virtually impossible for a child to unlock the connector, thereby childproofing the improved collar.

DETAILED DESCRIPTION OF THE PREFERRED EMBODIMENT

Figure 1:
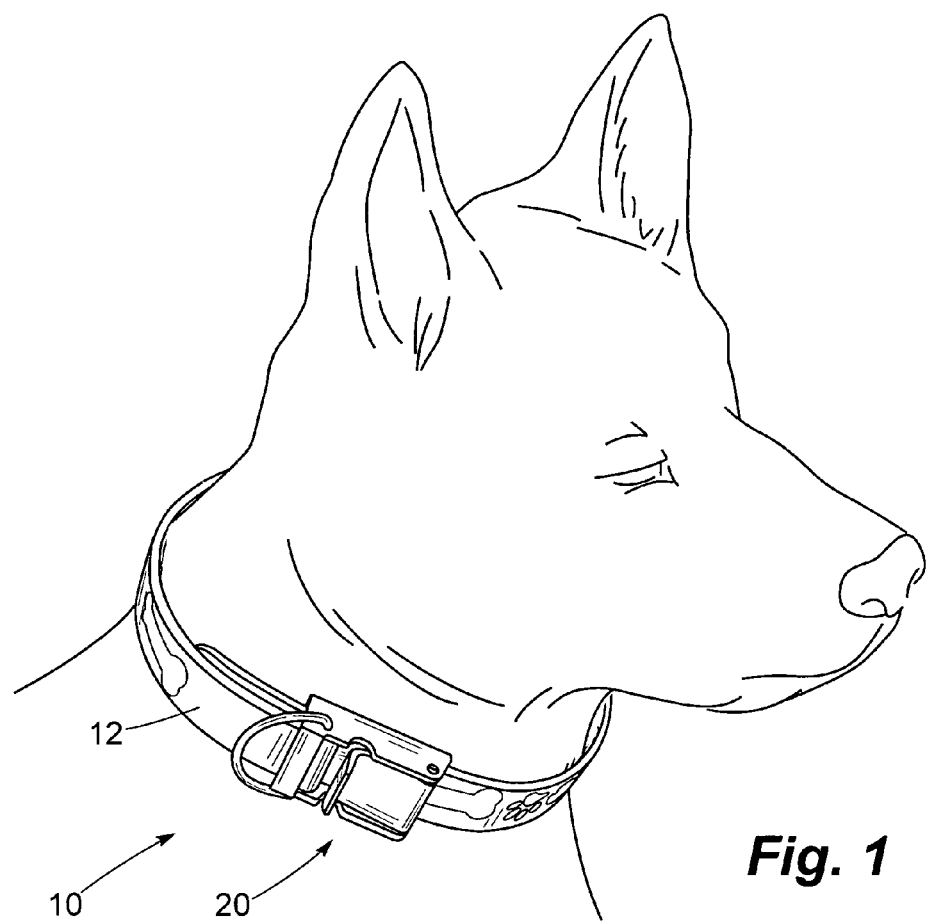
FIG. 1 is a perspective view of the improved collar according to the present invention, the collar being shown fitted on the neck of a typical dog.

In the drawings and indicated generally by the reference numeral 10 is a collar according to the present invention. The collar 10 comprises a closure connector 20 and an elongated, flexible belt 12 having both a free end 16 and distal therefrom a thickened knob 13.

Figure 3:
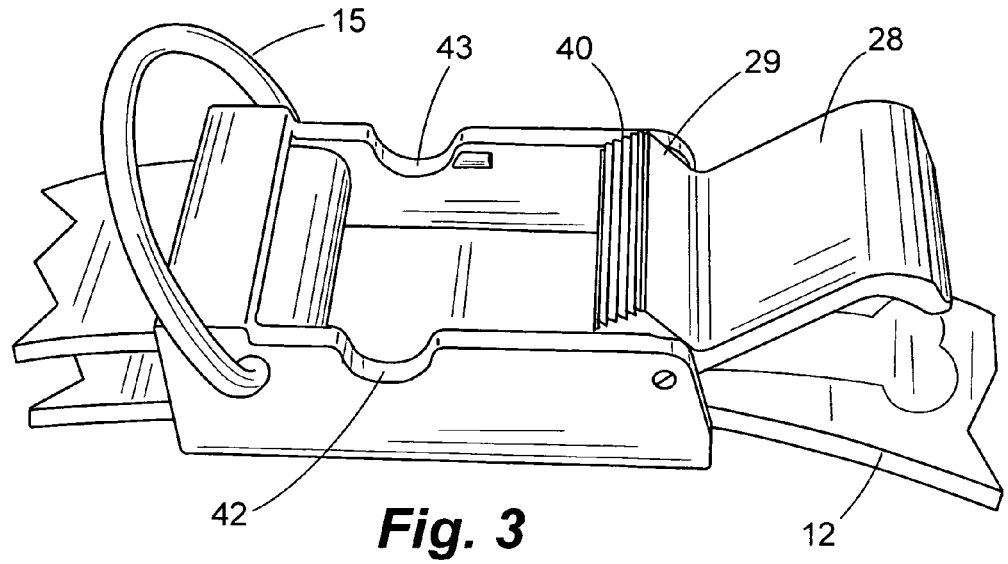
FIG. 3 is a perspective view, on a further enlarged scale, of fragmentary portions of the collar according to FIG. 1, a connector, including a frame and a movable arm pivotally connected thereto, being shown with the arm's foot fully disengaged from the collar's belt.
Figure 4:
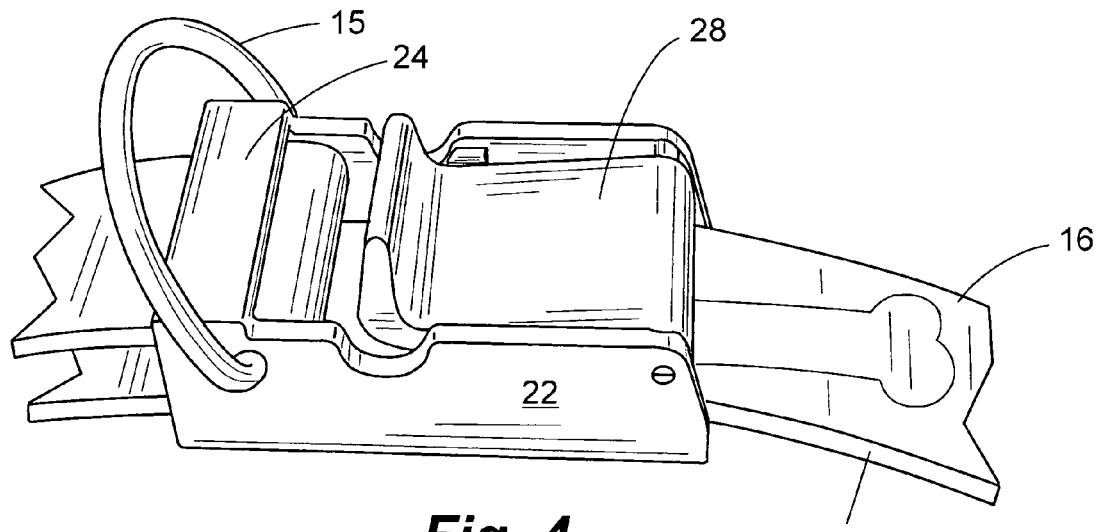
FIG. 4 is a perspective view of the fragmentary portions of the collar according to FIG. 3, the connector being shown with the arm's foot fully engaging the collar's belt.
Figures 8, 9:
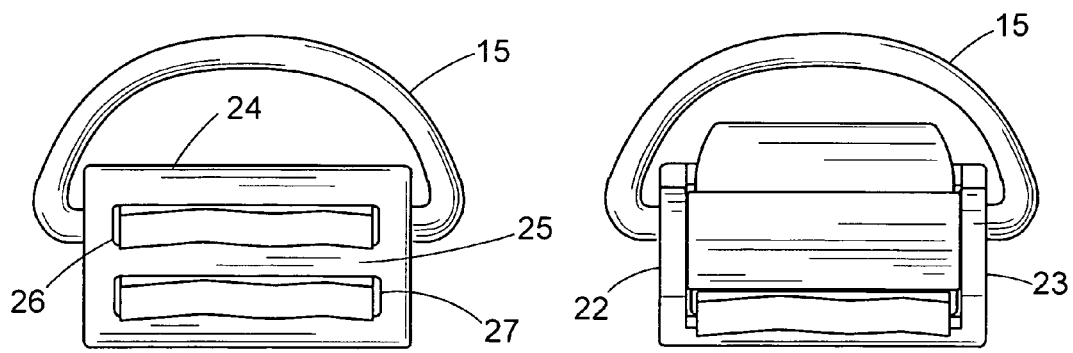
FIGS. 8 and 9 are elevation views of the distal ends of the collar's connector according to FIG. 4, elongated slots formed in one of these distal ends being shown with each slot occupied by a fragmentary portion of the collar's belt.
Figure 10:
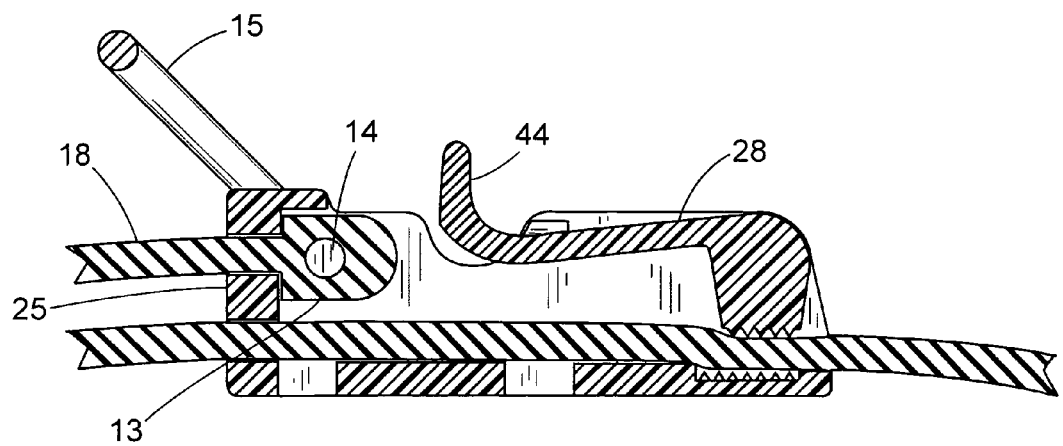
FIG. 10 is a cross-section, on a still further enlarged scale, taken along the longitudinal centerline of the fragmentary portions of the collar according to FIG. 6.
Figure 11:
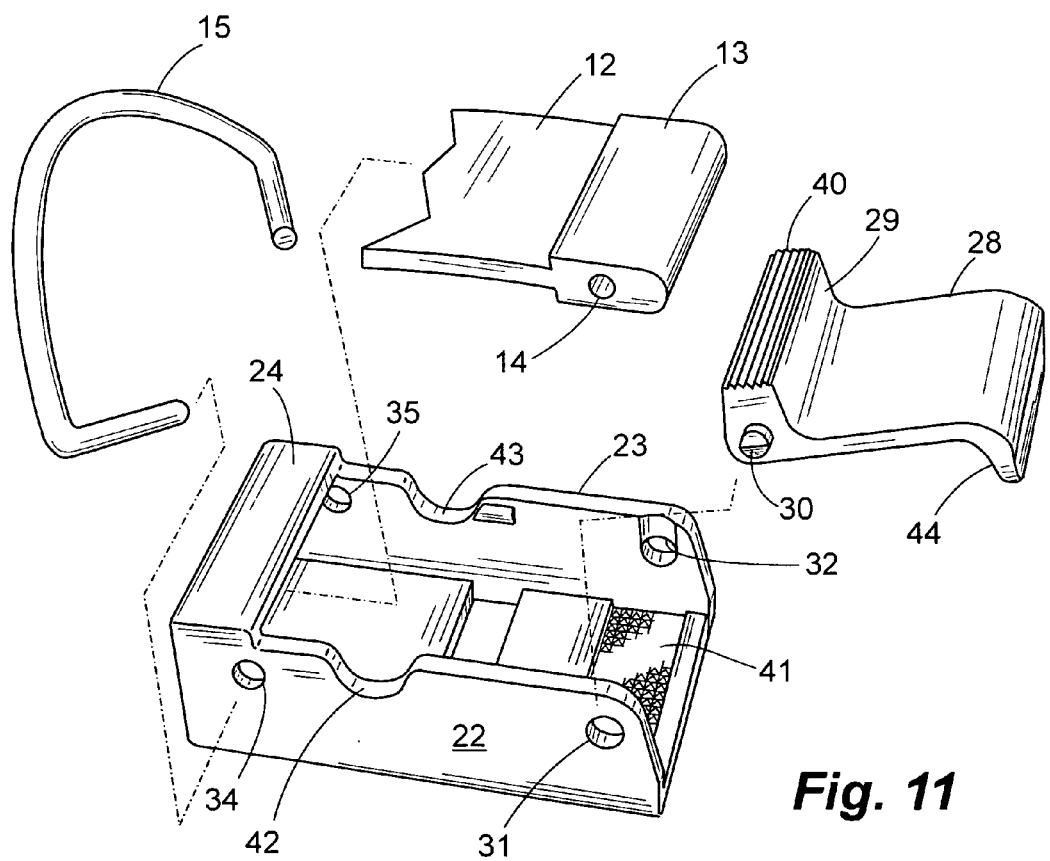
FIG. 11 is an exploded view, on a further enlarged scale, of fragmentary portions of the collar according to FIG. 2, showing the connector and a single short fragment of the collar's belt which terminates in a thickened knob.

The connector 20 includes an open-ended, elongated frame and an arm 28 pivotally connected thereto by a shaft 30 rotatably mounted within holes 31, 32 which are disposed proximate with the frame's open end and formed in opposing sides 22, 23 (FIGS. 3, 4 and 11). Spaced apart from each other by a distance which is preferably slightly greater than the transverse width of the belt 12, the sides 22, 23, together with the frame's base define a "U"-shaped channel. Distal from said open end, the channel is spanned by a narrow bar 24 atop the sides 22, 23 and terminates in a wall 25 in which a pair of elongated slots 26, 27, disposed with their longitudinal axes oriented perpendicularly to said sides, are formed (FIGS. 8 through 11). The distance between the elongated edges of the slot 26, which is located in close proximity to the bar 24, is preferably just wide enough to allow every part of the belt 12 except for the knob 13 to be passed through the slot 26 (FIGS. 8 and 10).

Positioned within the frame prior to use, the knob 13 not only abuts both elongated edges of the slot 26 but also fits just beneath the lower surface of the top bar 24 (FIG. 10). Holding the knob 13 securely against the slot 26 is a metal "D"-shaped ring 15 which is received by holes 34, 35 formed in the frame and a hole 14, alignable therewith, formed in the knob (FIGS. 10 and 11).

Also held in place with the use of holes formed near the upper edges of the sides 22, 23 are the ends of the shaft 30 which protrude from the arm 28. A semi "S"-shaped structure in longitudinal cross-section, the arm 28 defines both a foot 29 and a handle 44 (FIGS. 3, 10 and 11). Curving away from the arm's elongated mid-section, the foot 29 and the handle 44 extend perpendicularly thereto, but in opposite directions and spaced apart from each other.

Figure 5:
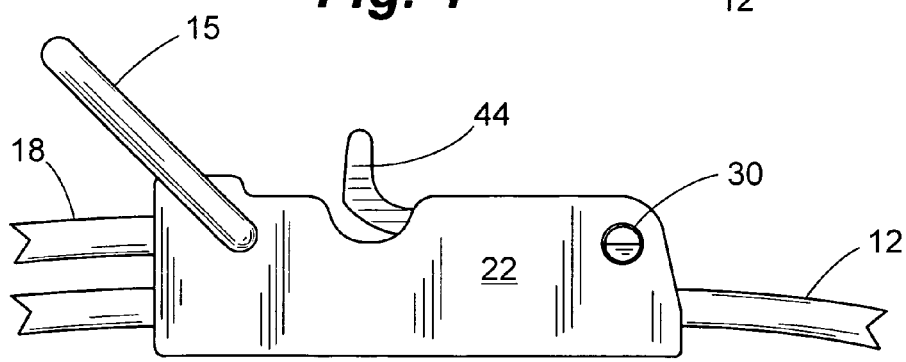
FIG. 5 is a side elevation view of the fragmentary portions of the collar according to FIG. 4.
Figure 6:
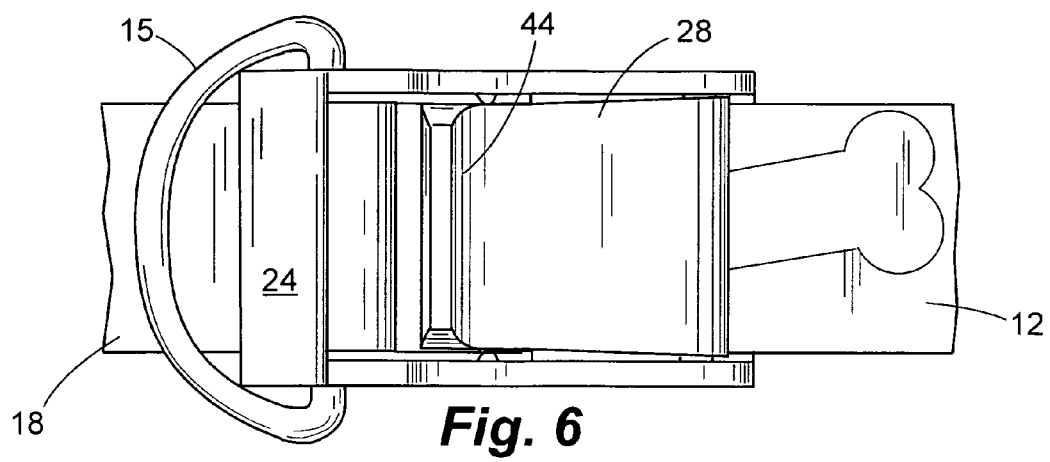
FIGS. 6 and 7 are top and bottom plan views, respectively, of the fragmentary portions of the collar according to FIG. 4.
Figure 7:
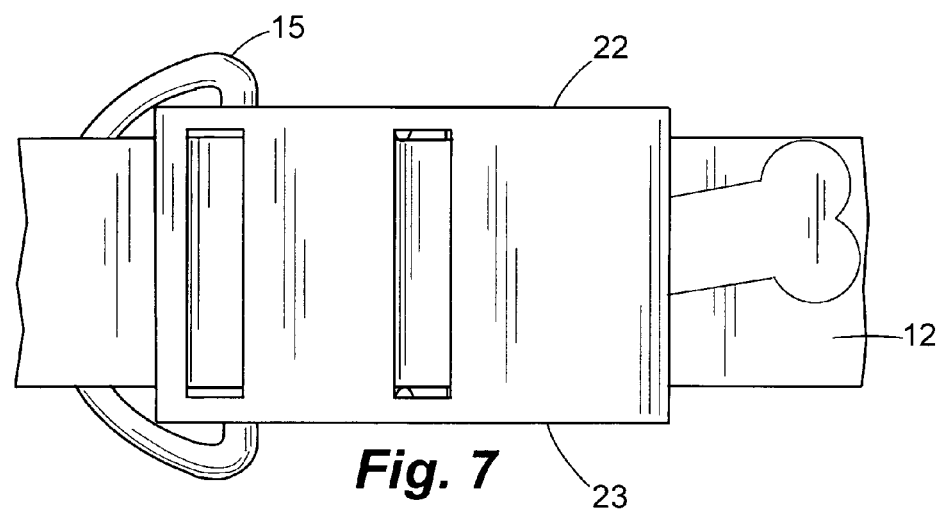

With the shaft's ends engaging the holes 31, 32, which are formed in the frame proximate with its open end, the arm itself is held in such a way that it can rotated into a position in which both the arm's mid-section and the foot 29 are nested between the sides 22, 23 (FIGS. 4 through 6). Moreover, the spacing between the frame's base and the shaft 30, when its ends are so engaged, is such that the foot 29 can clear the base by a distance which is slightly less than the thickness of the belt 12 (FIG. 10). In the preferred embodiment, the foot's contact surface 40 clears a section of the base which defines a shallow recess 41 by said distance (FIGS. 10 and 11).

Unlike the handle 44 which is tapered and narrower towards its tip, both the foot 29 and the arm's elongated mid-section preferably have the same transverse span throughout their respective lengths, said transverse span measuring slightly less than that of the spacing between the sides 22, 23 (FIGS. 3, 4 and 9). Cutouts 42, 43 formed in the sides 22, 23 are situated proximate with the tip of the handle 44, the only portion of the arm 28 which protrudes outwardly from the upper edges of the frame when the arm is otherwise fully nested within its "U"-shaped channel (FIGS. 4, 5 and 10).

Preferably molded from a hard, tough plastic material, the connector 20, including its frame and arm 28, can also be fabricated from a metal; but the material of choice is an ABS plastic, such as ABS-PA757, a product manufactured by the Chimei Corporation of Taiwan.

Figure 2:
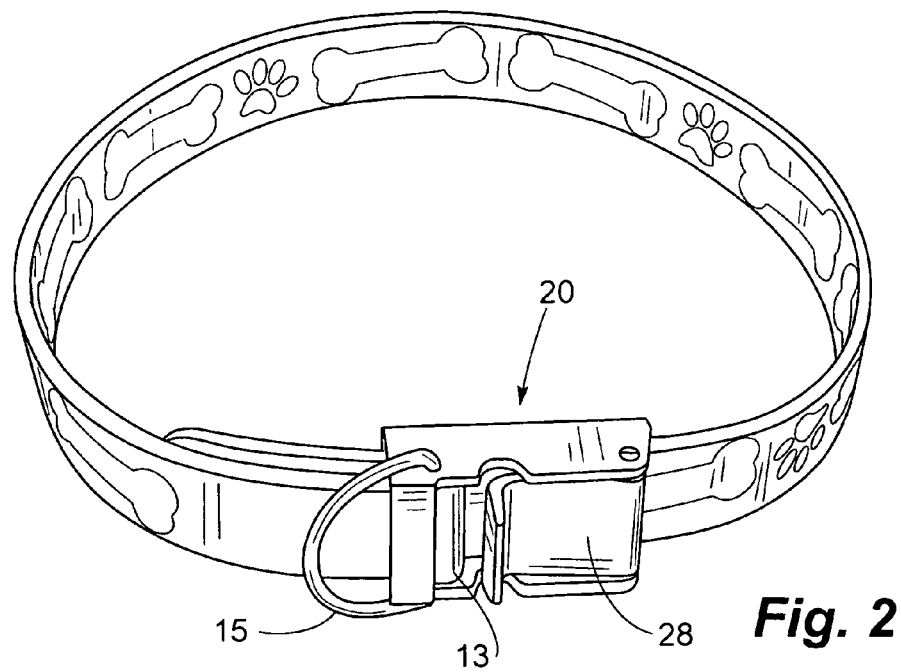
FIG. 2 is a perspective view, on an enlarged scale, of the collar according to FIG. 1.

While the belt 12 can be fabricated from conventional fabric, leather, or a plastic material, it is preferably molded, using silicon rubber or a like rubbery, generally transparent substance. Not only does molding with such a substance allow one to form the belt 12 as a single piece in which the thickened knob 13 with its hole 14 is an integral part of the belt, but also a phosphorescent additive can be incorporated into the mold, giving the finished belt luminescent properties. In addition, ornamental designs can be readily imprinted on the belt 12 during the molding process (FIG. 2).

A suitable silicon rubber is available commercially from Hongda New Material Co., Ltd., China and is known as this company's Product No. 7861WJL. When molded, this silicon rubber, with a Durometer reading of 65±5 A in the preferred embodiment, has been formed into belts having both smooth and design finishes. Very flexible and slightly elastic in character, a belt 12 fabricated of this material gives a slick, rubbery feeling when touched and is generally non-irritating to the skin and hair of animals wearing such a belt.

Moreover, cast as a mixture with a suitable phosphorescent additive, the preferred silicon rubber yields a belt 12 which can be seen in the dark. Its luminescent properties are especially pronounced when coarse particles of a substance known as LumiNova® G-300 M or, alternately, LumiNova® G-300 L, are incorporated into the mold. Manufactured by Nemoto & Co., Ltd., of Tokyo, Japan, this material, as tests of its luminance have revealed, is not only up to ten times brighter than are conventional zinc sulfide-based phosphorescent pigments, but also the length of its afterglow is longer than theirs by an order of magnitude. Based on strontium oxide aluminate chemistry, LumiNova® G-300 M, similar to alumina in hardness, has sharp-edged, needle-like particles which typically range in size from 10 to 40 micrometers. The percentage by weight of these particles in said silicon rubber mixture is preferably about 18 percent but can range between 5 and 30 percent and still give the belt 12 both pronounced luminescent properties and adequate tensile strength to restrain a typical dog.

Tested for tensile strength, a collar 20 having a belt 12 molded out of the preferred silicon rubber/phosphorescent additive mixture, with the belt measuring 1 inch wide, ⅛th inch thick, and about 18 inches long, was found to have a tension breaking strength of approximately 130 pounds of force. Of six specimens tested, only four of them actually broke when their respective belts 12 were stretched to the full limit of the test frame; and none of these breakages occurred because of a failure of the connector 20.

At the outset of the collar's assembly, the arm 28 is rotatably mounted on the connector's frame by spreading its sides 22, 23 apart slightly to accommodate the ends of the shaft 30, so that they can be rotatably received within holes 31, 32. The belt's free end 16 is then inserted beneath the connector's top bar 24 and threaded through its upper slot 26 until the thickened knob 13 is brought into contact with the upper slot's elongated edges. After that, the "D"-shaped ring 15 is installed by first positioning the thickened knob 13 in such a way that it not only abuts the slot 26 but also the knob's hole 14 is aligned with paired holes 34, 35 formed in the frame's sides 22, 23. The "D"-shaped ring 15 itself is then simultaneously inserted into the paired holes 34, 35 and pressed into the thickened knob's hole 14, thereby completing the collar's assembly.

Fitting the collar 10 onto a dog entails encircling his neck with the belt 12 and then positioning an end portion thereof disposed distal from the thickened knob 13 within the connector 20. Properly positioned, the end portion passes under the foot 29 and extends from the frame's open end to the lower slot 27, with the belt's free end 16 protruding outwardly therefrom (FIG. 1). Thus situated, the free end 16 remains virtually hidden from view between the belt's outer layer 18 and the animal's neck (FIGS. 5, 6 and 10).

Once the belt has been adjusted so as to provide a comfortable fit about the dog's neck, one can then activate the collar's closure mechanism by simply rotating the arm 28 downwardly into the connector's frame until the foot 29 pinches the belt 12 against the frame's base.

In the preferred embodiment, the portion of the belt so pinched is sandwiched between the foot's contact surface 40 and the shallow recess 41 (FIGS. 10 and 11). Roughened by knurling or the like on their respective mating surfaces, the foot 29 and the shallow recess 41 engage the belt 12 in such a way that a dog, by pulling on a collar 10 fitted about his neck, tends to draw the end of the arm 28 distal from the foot further into the "U"-shaped channel. In the process, the contact surface 40 is tipped upwardly towards the frame's open end, thereby creating a small gap. Simultaneously, as the dog subsequently releases his pull, the rubbery belt 12 springs back, filling this gap, and forms a wedge between the foot 29 and the recess 41. This wedge then prevents the arm 28 from automatically returning to the position it assumed earlier, prior to the dog's pulling action, and in effect provides the collar 10 with a self-clamping closure mechanism.

To remove the collar 10, one deactivates its closure mechanism by grasping the handle 44 and rotating the arm 28 upwardly until the belt 12 is freed and can be slid out of the connector's open end. A tool such as a screwdriver's blade (not shown) can be inserted through the cutouts 42, 43 and beneath the arm 28 and has been found to be useful, even necessary, for unlocking the connector 20 once the self-clamping closure mechanism is engaged.

The invention claimed is:

1. A collar, comprising:
(a) an elongated belt and a thickened knob disposed at one end thereof, the belt and the knob forming integral parts of a single piece fabricated from a rubber material;
(b) a connector having a frame which defines an open end and includes a slotted wall, a pair of opposing sides and a base, each of said sides extending longitudinally between the frame's open end and the slotted wall;
(c) means, including the thickened knob and the slotted wall, for anchoring the belt to the frame; and
(d) an arm, including an elongated mid-section and a foot which curves away therefrom, pivotally connected to the frame at points thereon disposed proximate with the frame's open end, the arm so connected being rotatable into a position in which both the arm's mid-section and the foot are nested between the opposing sides, spacing between the arm's axis of rotation and the frame's base being such that the foot, when it is disposed in closest proximity to the base, clears the base by a distance which is slightly less than the belt's thickness, so that once a section of the belt distal from the thickened knob has been inserted through the frame's open end and pushed into the frame between its base and the arm, the foot can be brought into contact with the belt and, in the process, clamp a short portion of the belt against the frame, wherein the means for anchoring the belt to the frame further includes a "D"-shaped ring, and wherein the slotted wall and the thickened knob define a narrow, elongated slot and a hole, respectively; spacing between the slot's elongated edges being sufficiently narrow that the thickened knob abuts both of the elongated edges when the knob is held contiguous with the slot; the hole, which is disposed perpendicularly to the belt's longitudinal centerline, receiving opposing ends of the "D"-shaped ring when it is connected to the thickened knob in assembled relation, the knob's hole being sized in such a way that when the ring's ends are pressed into it, the knob expands, becoming thicker in the process and making the knob more resistant to being pulled through the slot.

2. The collar according to claim 1, wherein the belt is further characterized as having generally flat inner and outer sides from which the thickened knob protrudes perpendicularly, the belt's inner and outer sides extending from its free end to the thickened knob; and wherein the slotted wall defines a narrow, elongated slot, the elongated edges thereof being spaced far enough apart that the slot can receive the belt as its inner and outer sides are passed between the elongated edges; the spacing between the elongated edges being sufficiently narrow that the thickened knob's protrusions abut both of the elongated edges when the knob is held, on the inside of the connector's frame, contiguous with the slot and in such a way that the belt's inner and outer sides extend outwardly through the slot.

3. The collar according to claim 1, wherein the foot defines a contact surface which, in use, clamps said short portion of the belt against the frame, the contact surface having a transverse span which measures slightly less in length than does the spacing between the frame's opposing sides, so that the short portion, when it is so clamped, is pressed, across its entire transverse width, between the foot and the frame.

4. The collar according to claim 3, wherein the frame's base defines a shallow recess which is disposed downwardly of the arm's axis of rotation and proximate with the frame's open end, so that when the foot is brought into contact with the belt, the foot presses the short portion of the belt against the shallow recess; the foot and the shallow recess engaging the belt in such a way that a pull on the belt directed outwardly from the frame's open end simultaneously draws the arm's end distal from the foot downwardly towards the frame's base and tips the foot's contact surface upwardly towards the frame's open end, thus creating a gap into which the rubbery belt, once the pull has been released, springs back, forming a wedge between the foot and the recess which keeps the arm from returning to its pre-pull position, thereby clamping the belt more firmly between the foot and the frame.

5. The collar according to claim 1, wherein the frame's base defines a shallow recess which is disposed downwardly of the arm's axis of rotation and proximate with the frame's open end and wherein the foot and the recess define first and second contact surfaces, respectively, of generally roughened character; the first contact surface being positioned on the foot in such a way that the belt is pinched between the first and second contact surfaces whenever the foot is used to clamp the belt against the frame.

6. The collar according to claim 1, wherein the belt is further characterized as having inner and outer sides which extend from its free end to the thickened knob; and wherein the slotted wall defines first and second narrow, elongated slots, the longitudinal axes thereof being disposed perpendicularly to the frame's sides; the spacing between the elongated edges of the first slot being sufficiently narrow that the thickened knob abuts both of the elongated edges when the knob is held on the inside of the frame, contiguous with the first slot and in such a way that the belt's inner and outer sides extend outwardly through the first slot; the elongated edges of the second slot, which is disposed downwardly of the first slot and proximate with the frame's base, being spaced far enough apart that the second slot can receive the belt, so that, in use, the belt's free end, once said section of the belt distal from the thickened knob has been pushed into the frame between its base and the arm, can protrude into the second slot and extend outwardly therefrom, tucked under a portion of the belt which extends outwardly from the first slot.

7. The collar according to claim 1, wherein the rubber material from which the belt and the thickened knob are fabricated comprises a silicon rubber having a Durometer reading in the range of 40 A to 80 A.

8. The collar according to claim 1, wherein the rubber material from which the belt and the thickened knob are fabricated comprises a mixture of a generally transparent silicon rubber and a phosphorescent additive.

9. A collar, comprising;
   (a) an elongated belt;
   (b) a frame having a base and a pair of opposing sides connected thereto;
   (c) means for anchoring one end of the belt to the frame; and
   (d) an arm, including an elongated bar and a foot which curves away therefrom, pivotally connected to the frame at points thereon disposed distal from said end of the belt when it is anchored to the frame, the arm being rotatable into a position in which both the elongated bar and the foot are nested between the opposing sides, spacing between the arm's axis of rotation and the frame's base being such that the foot, when it is disposed in closest proximity to the base, clears the base by a distance which is slightly less than the belt's thickness, so that once the belt has been looped around the frame and a section of the belt distal from said end thereof has been pushed into the frame between its base and the arm, the foot can be brought into contact with the belt and, in the process, clamp a short portion of the belt against the frame, wherein the anchoring means includes a thickened knob; and wherein the belt and the thickened knob are further characterized as forming integral parts of a single piece fabricated from a rubber material, and wherein the anchoring means further includes a "D"-shaped ring, and wherein the slotted wall and the thickened knob define a narrow, elongated slot and a hole, respectively; spacing between the slot's elongated edges being sufficiently narrow that the thickened knob abuts both of the elongated edges when the knob is held contiguous with the slot; the hole, which is disposed perpendicularly to the belt's longitudinal centerline, receiving opposing ends of the "D"-shaped ring when it is connected to the thickened knob in assembled relation, the knob's hole being sized in such a way that when the ring's ends are pressed into it, the knob expands, becoming thicker in the process and making the knob more resistant to being pulled through the slot.

10. The collar according to claim 9, wherein the foot defines a contact surface which, in use, clamps said short portion of the belt against the frame, the contact surface having a span which, in a direction oriented perpendicularly to the longitudinal centerline of said section of the belt so pushed into the frame, is substantially as wide as the spacing between the frame's opposing sides, so that the short portion, when it is so clamped, is pressed, across at least most of its transverse width, between the foot and the frame.

11. The collar according to claim 10, wherein the foot and the frame are further characterized as engaging the belt, when a short portion thereof is clamped between them, in such a way that a pull on the belt's looped portion simultaneously draws the arm's end distal from the foot downwardly towards the frame's base and tips the foot's contact surface upwardly; and wherein the belt is further characterized as being fabricated from a material with elastic properties, the belt, once the pull has been released, springing back beneath the foot's upwardly tipped contact surface and forming a wedge between the foot and the frame, thereby clamping the belt more firmly when it is stressed.

12. The collar according to claim 9, wherein the rubber material from which the belt and the thickened knob are fabricated comprises a mixture of a generally transparent silicon rubber and a phosphorescent additive.

\* \* \* \* \*